United States Patent
Bogdanski et al.

(10) Patent No.: US 11,750,513 B2
(45) Date of Patent: *Sep. 5, 2023

(54) SYSTEM AND METHOD FOR SCALABLE MULTI-HOMED ROUTING FOR VSWITCH BASED HCA VIRTUALIZATION

(71) Applicant: ORACLE INTERNATIONAL CORPORATION, Redwood Shores, CA (US)

(72) Inventors: Bartosz Bogdanski, Oslo (NO); Bjørn Dag Johnsen, Oslo (NO); Line Holen, Fetsund (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/387,142

(22) Filed: Jul. 28, 2021

(65) Prior Publication Data

US 2021/0359937 A1    Nov. 18, 2021

Related U.S. Application Data

(63) Continuation of application No. 16/512,069, filed on Jul. 15, 2019, now Pat. No. 11,102,112, which is a
(Continued)

(51) Int. Cl.
*H04L 49/00* (2022.01)
*H04L 45/64* (2022.01)
*H04L 41/0806* (2022.01)

(52) U.S. Cl.
CPC .......... *H04L 45/64* (2013.01); *H04L 41/0806* (2013.01); *H04L 49/70* (2013.01)

(58) Field of Classification Search
CPC ..... H04L 45/64; H04L 41/0806; H04L 49/70; H04L 41/12
See application file for complete search history.

(56) References Cited

U.S. PATENT DOCUMENTS 11,102,112 B2    8/2021   Bogdanski
11,522,775 B2 *  12/2022  Pang ................... H04W 84/18
(Continued)

FOREIGN PATENT DOCUMENTS

JP    2007318449    12/2007
JP    2013051647    3/2013

OTHER PUBLICATIONS

The Korean Intellectual Property Office, Notice of Office Action dated Feb. 25, 2022 fro Korean Patent Application No. 10-2017-7010777, 12 pages.
(Continued)

*Primary Examiner* — Chris Parry
*Assistant Examiner* — Hassan A Khan
(74) *Attorney, Agent, or Firm* — TUCKER ELLIS LLP

(57) ABSTRACT

Systems and methods are provided for supporting scalable multi-homed routing for virtual switch based host channel adapter (HCA) virtualization in a subnet. An exemplary method can provide one or more switches, a plurality of host channel adapters, a plurality of hypervisors, and a plurality of virtual machines. The method can arrange the plurality of host channel adapters with one or more of a virtual switch with prepopulated local identifiers (LIDs) architecture or a virtual switch with dynamic LID assignment architecture. The method can further perform a multi-homed routing for the subnet, wherein at least one of the plurality of host channel adapters comprises two virtual switches, wherein the two virtual switches are treated as endpoints of the subnet, and wherein the multi-homed routing for the subnet
(Continued)

ensures that each the two virtual switches are routed through independent paths.

17 Claims, 12 Drawing Sheets

Related U.S. Application Data continuation of application No. 15/295,825, filed on Oct. 17, 2016, now Pat. No. 10,397,105.

(60) Provisional application No. 62/252,255, filed on Nov. 6, 2015.

(56) References Cited

U.S. PATENT DOCUMENTS

| | | | |
|---|---|---|---|
| 11,528,238 B2* | 12/2022 | Tasoulas | H04L 67/568 |
| 11,528,283 B2* | 12/2022 | Yadav | H04L 43/04 |
| 2004/0202189 A1* | 10/2004 | Arndt | H04L 69/32 370/409 |
| 2006/0230219 A1 | 10/2006 | Njoku | G06F 13/102 710/316 |
| 2006/0242330 A1* | 10/2006 | Torudbakken | G06F 13/4004 710/5 |
| 2006/0242332 A1* | 10/2006 | Johnsen | G06F 13/28 710/22 |
| 2006/0242333 A1* | 10/2006 | Johnsen | H04L 45/00 710/30 |
| 2006/0242352 A1* | 10/2006 | Torudbakken | G06F 13/4022 710/312 |
| 2006/0242354 A1* | 10/2006 | Johnsen | G06F 13/404 710/316 |
| 2006/0253619 A1* | 11/2006 | Torudbakken | G06F 13/4022 710/31 |
| 2007/0140266 A1* | 6/2007 | Njoku | G06F 13/102 370/399 |
| 2008/0186990 A1* | 8/2008 | Abali | G06F 9/45558 370/419 |
| 2011/0145916 A1* | 6/2011 | Mckenzie | G06F 21/31 718/1 |
| 2011/0154818 A1* | 6/2011 | Takahata | F02B 39/005 60/599 |
| 2012/0027017 A1* | 2/2012 | Rai | H04L 12/1886 370/392 |
| 2012/0300669 A1* | 11/2012 | Zahavi | H04L 49/10 370/254 |
| 2013/0114620 A1* | 5/2013 | Bogdanski | H04L 45/48 370/408 |
| 2013/0151685 A1* | 6/2013 | Bursell | H04L 49/70 709/223 |
| 2013/0254321 A1* | 9/2013 | Johnsen | G06F 15/17331 709/212 |
| 2013/0254368 A1* | 9/2013 | Guay | G06F 9/45558 709/223 |
| 2013/0254404 A1* | 9/2013 | Johnsen | G06F 9/45558 709/226 |
| 2013/0254424 A1* | 9/2013 | Guay | G06F 9/5077 709/238 |
| 2013/0254766 A1* | 9/2013 | Zuo | H04L 49/70 718/1 |
| 2013/0262937 A1* | 10/2013 | Sridharan | G06F 11/0709 370/242 |
| 2014/0047441 A1* | 2/2014 | Miyauchi | G06F 9/45533 718/1 |
| 2014/0052877 A1* | 2/2014 | Mao | H04L 12/4641 709/245 |
| 2014/0177629 A1* | 6/2014 | Manula | H04L 49/201 370/390 |
| 2014/0219287 A1* | 8/2014 | Birke | H04L 47/621 370/412 |
| 2015/0030034 A1* | 1/2015 | Bogdanski | H04L 49/358 370/401 |
| 2015/0271244 A1* | 9/2015 | Bloch | H04L 69/40 709/217 |
| 2016/0087933 A1* | 3/2016 | Johnson | H04L 41/08 709/245 |
| 2016/0259661 A1* | 9/2016 | Tasoulas | G06F 9/5088 |
| 2016/0380865 A1* | 12/2016 | Dubai | H04L 43/026 709/224 |
| 2017/0289186 A1* | 10/2017 | Staniford | H04L 63/1425 |
| 2018/0241613 A1* | 8/2018 | Chen | H05B 47/175 |
| 2018/0337990 A1* | 11/2018 | Tasoulas | H04L 67/1095 |
| 2021/0342232 A1* | 11/2021 | Gopalan | G06F 11/1451 |

OTHER PUBLICATIONS

Guay, Wei Lin et al., "A Scalable Signalling Mechanism for VM Migration with SR-IOV over InfiniBand", 2012 IEEE 18th International Conference on Parallel and Distributed Systems ©2012 IEEE, 7 pages.

Han, et al., "A Novel Multipath Load Balancing Algorithm in Fat-Tree Data Center", Dec. 2009, Cloud Computing, First International Conference, CloudCom 2009, 10 pages.

United States Patent and Trademark Office, Office Communication dated Jan. 13, 2023 for U.S. Appl. No. 17/458,030, 13 pages.

Ma, Yi-Man et al., "InfiniBand Virtualization on KVM", 2012 IEEE 4th International Conference on Cloud Computing Technology and Science, pp. 777-781.

* cited by examiner

```
┌─────────────────────────────────────────────────────────────────┐
│ Providing, at one or more computers, including one or more       │
│ microprocessors, one or more switches, the one or more switches  │
│ comprising at least a leaf switch, wherein each of the one or    │
│ more switches comprise a plurality of ports; a plurality of host │
│ channel adapters, wherein one or more of the plurality of host   │
│ channel adapters comprise at least one virtual function, and     │
│ wherein the plurality of host channel adapters are interconnected│ ~1210
│ via the one or more switches; a plurality of hypervisors, wherein│
│ each of the one or more hypervisors are associated with at least │
│ one host channel adapter of the one or more host channel adapters│
│ that comprise at least one virtual function; and a plurality of  │
│ virtual machines, wherein each of the plurality of virtual       │
│ machines are associated with at least one virtual function       │
└─────────────────────────────────────────────────────────────────┘
                                  │
                                  ▼
┌─────────────────────────────────────────────────────────────────┐
│ Arranging the plurality of host channel adapters that comprise   │
│ at least one virtual function with one or more of a virtual      │
│ switch with prepopulated local identifiers (LIDs) architecture   │ ~1220
│ or a virtual switch with dynamic LID assignment architecture.    │
└─────────────────────────────────────────────────────────────────┘
                                  │
                                  ▼
┌─────────────────────────────────────────────────────────────────┐
│ Performing a multi-homed routing for the subnet; wherein at      │
│ least one of the plurality of host channel adapters that         │
│ comprise at least one virtual function comprises two virtual     │
│ switches, wherein the two virtual switches are treated as        │ ~1230
│ endpoints of the subnet; and wherein the multi-homed routing for │
│ the subnet ensures that each the two virtual switches are routed │
│ through independent paths.                                       │
└─────────────────────────────────────────────────────────────────┘
```

FIGURE 12

SYSTEM AND METHOD FOR SCALABLE MULTI-HOMED ROUTING FOR VSWITCH BASED HCA VIRTUALIZATION

CLAIM OF PRIORITY AND CROSS REFERENCE TO RELATED APPLICATIONS

This application is a continuation of and claims the benefit of priority to U.S. patent application entitled "SYSTEM AND METHOD FOR SCALABLE MULTI-HOMED ROUTING FOR vSWITCH BASED HCA VIRTUALIZATION", application Ser. No. 16/512,069, filed on Jul. 15, 2019, which application is a continuation of and claims the benefit of priority to U.S. patent application entitled "SYSTEM AND METHOD FOR SCALABLE MULTI-HOMED ROUTING FOR vSWITCH BASED HCA VIRTUALIZATION", application Ser. No. 15/295,825, filed on Oct. 17, 2016, which application claims the benefit of priority to U.S. Provisional Patent Application entitled "SYSTEM AND METHOD FOR SCALABLE MULTI-HOMED ROUTING FOR vSWITCH BASED HCA VIRTUALIZATION", Application No. 62/252,255, filed on Nov. 6, 2015; this application is related to U.S. patent application entitled "SYSTEM AND METHOD FOR SUPPORTING MULTI-HOMED FAT-TREE ROUTING IN A MIDDLEWARE MACHINE ENVIRONMENT", application Ser. No. 14/226,288, filed Mar. 26, 2014; and U.S. patent application entitled "SYSTEM AND METHOD SYSTEM AND METHOD FOR PROVIDING AN INFINIBAND SR-IOV vSWITCH ARCHITECTURE FOR A HIGH PERFORMANCE CLOUD COMPUTING ENVIRONMENT," application Ser. No. 15/050,901, filed Feb. 23, 2016, each of which applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting computer system virtualization and live migration using SR-IOV vSwitch architecture.

BACKGROUND

As larger cloud computing architectures are introduced, the performance and administrative bottlenecks associated with the traditional network and storage have become a significant problem. There has been an increased interest in using InfiniBand (IB) technology as the foundation for a cloud computing fabric. This is the general area that embodiments of the invention are intended to address.

SUMMARY

Described herein are systems and methods for supporting scalable multi-homed routing for virtual switch based host channel adapter (HCA) virtualization in a subnet. An exemplary method can provide, at one or more computers, including one or more microprocessors, one or more switches, the one or more switches comprising at least a leaf switch, wherein each of the one or more switches comprise a plurality of ports; a plurality of host channel adapters, wherein one or more of the plurality of host channel adapters comprise at least one virtual function, and wherein the plurality of host channel adapters are interconnected via the one or more switches; a plurality of hypervisors, wherein each of the one or more hypervisors are associated with at least one host channel adapter of the one or more host channel adapters that comprise at least one virtual function; and a plurality of virtual machines, wherein each of the plurality of virtual machines are associated with at least one virtual function. The method can arrange the plurality of host channel adapters that comprise at least one virtual function with one or more of a virtual switch with prepopulated local identifiers (LIDs) architecture or a virtual switch with dynamic LID assignment architecture. The method can also perform a multi-homed routing for the subnet; wherein at least one of the plurality of host channel adapters that comprise at least one virtual function comprises two virtual switches, wherein the two virtual switches are treated as endpoints of the subnet; and wherein the multi-homed routing for the subnet ensures that each the two virtual switches are routed through independent paths.

BRIEF DESCRIPTION OF THE FIGURES

FIG. 12 is a flow chart of a method for supporting scalable multi-homed routing for virtual switch based host channel adapter (HCA) virtualization in a subnet, in accordance with an embodiment.

DETAILED DESCRIPTION

Figure 1:
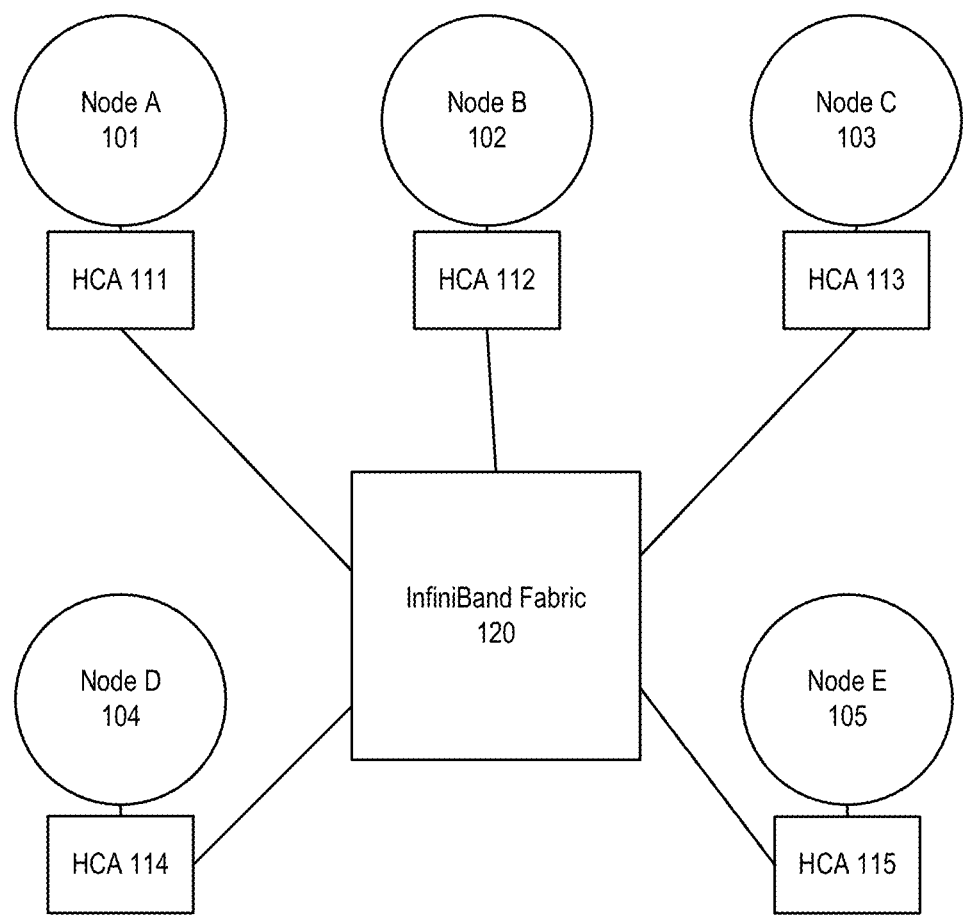
FIG. 1 shows an illustration of an InfiniBand environment, in accordance with an embodiment.

The invention is illustrated, by way of example and not by way of limitation, in the figures of the accompanying drawings in which like references indicate similar elements.

It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for supporting scalable multi-homed routing for virtual switch based host channel adapter (HCA) virtualization in a subnet.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated subnet device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, inter- and intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switches and routers with the partition enforcement tables containing P_Key information associated with the LIDs. Additionally, in a general case, partition membership of a switch port can represent a union of all membership indirectly associated with LIDs routed via the port in an egress (towards the link) direction.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, to achieve live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 2:
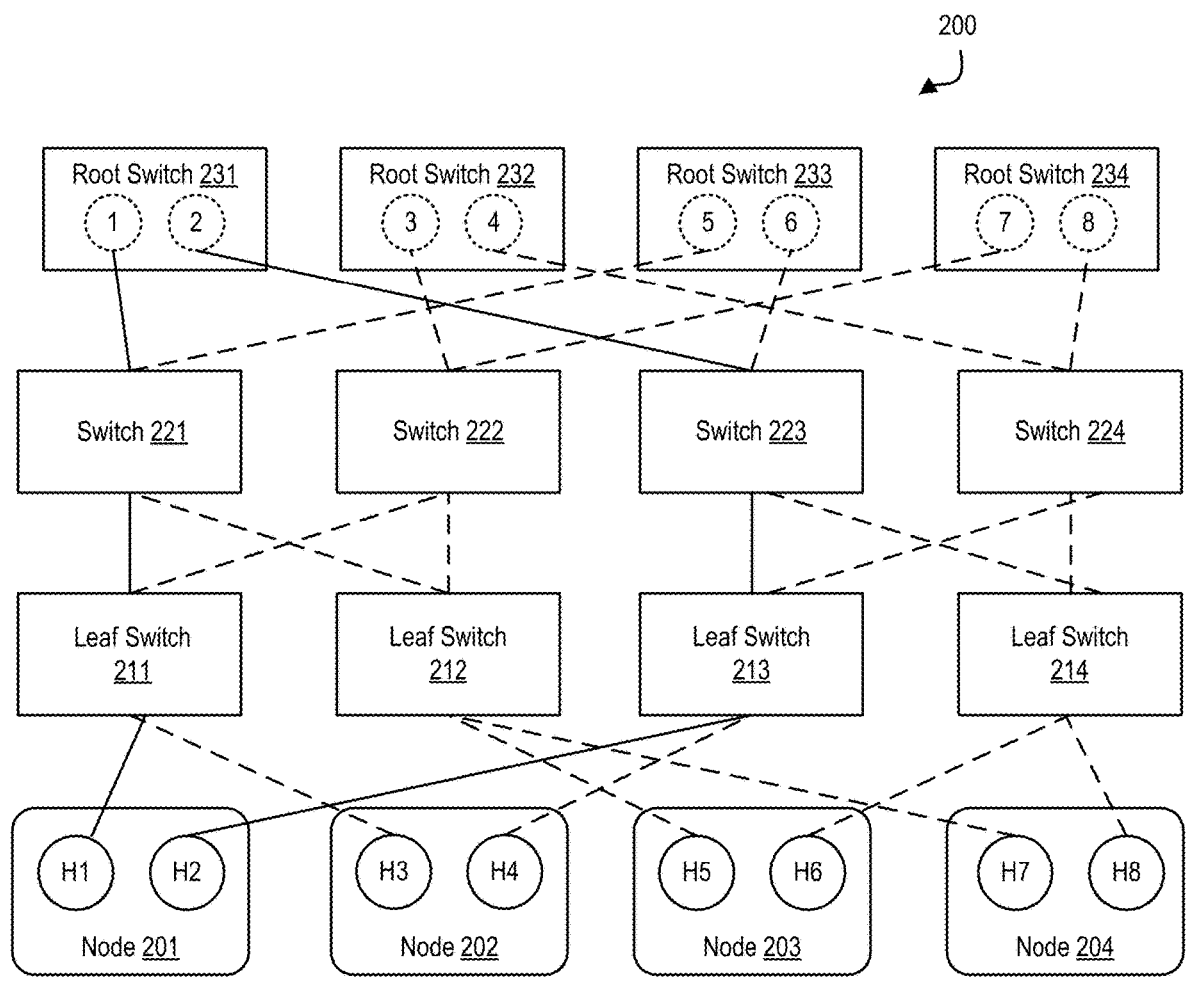
FIG. 2 shows an illustration of a tree topology in a network environment, accordance with an embodiment.

FIG. 2 shows an illustration of a tree topology in a network environment, in accordance with an embodiment. As shown in FIG. 2, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 2, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing is done oblivious to the partitions, fat-tree routed subnets, in general, provide poor isolation among partitions.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model and a virtual switch model.

Figure 3:
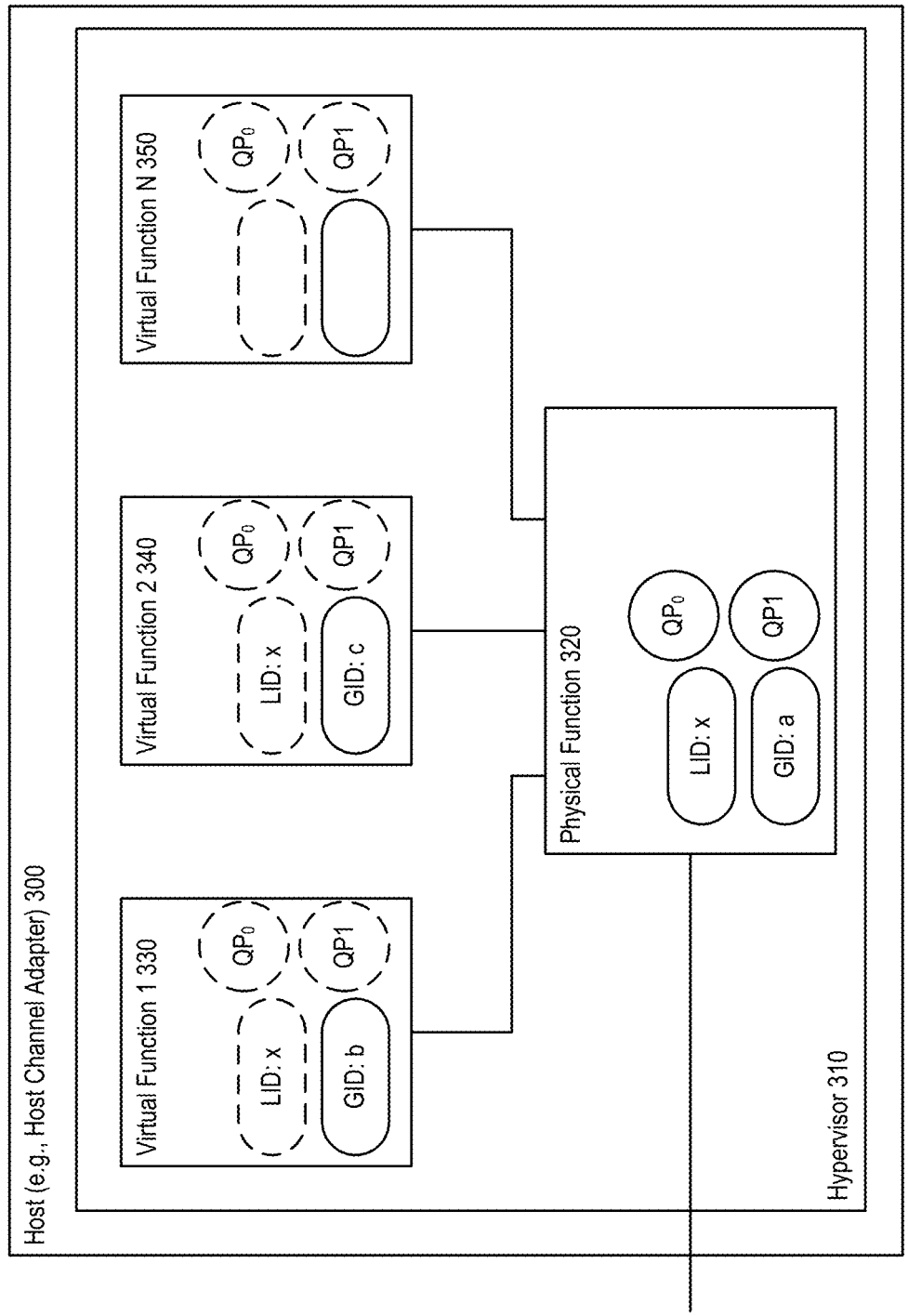
FIG. 3 shows an exemplary shared port architecture, in accordance with an embodiment.

FIG. 3 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 3, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 3, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

There can be different types of SR-IOV models, e.g. a shared port model and a virtual switch model.

Figure 4:
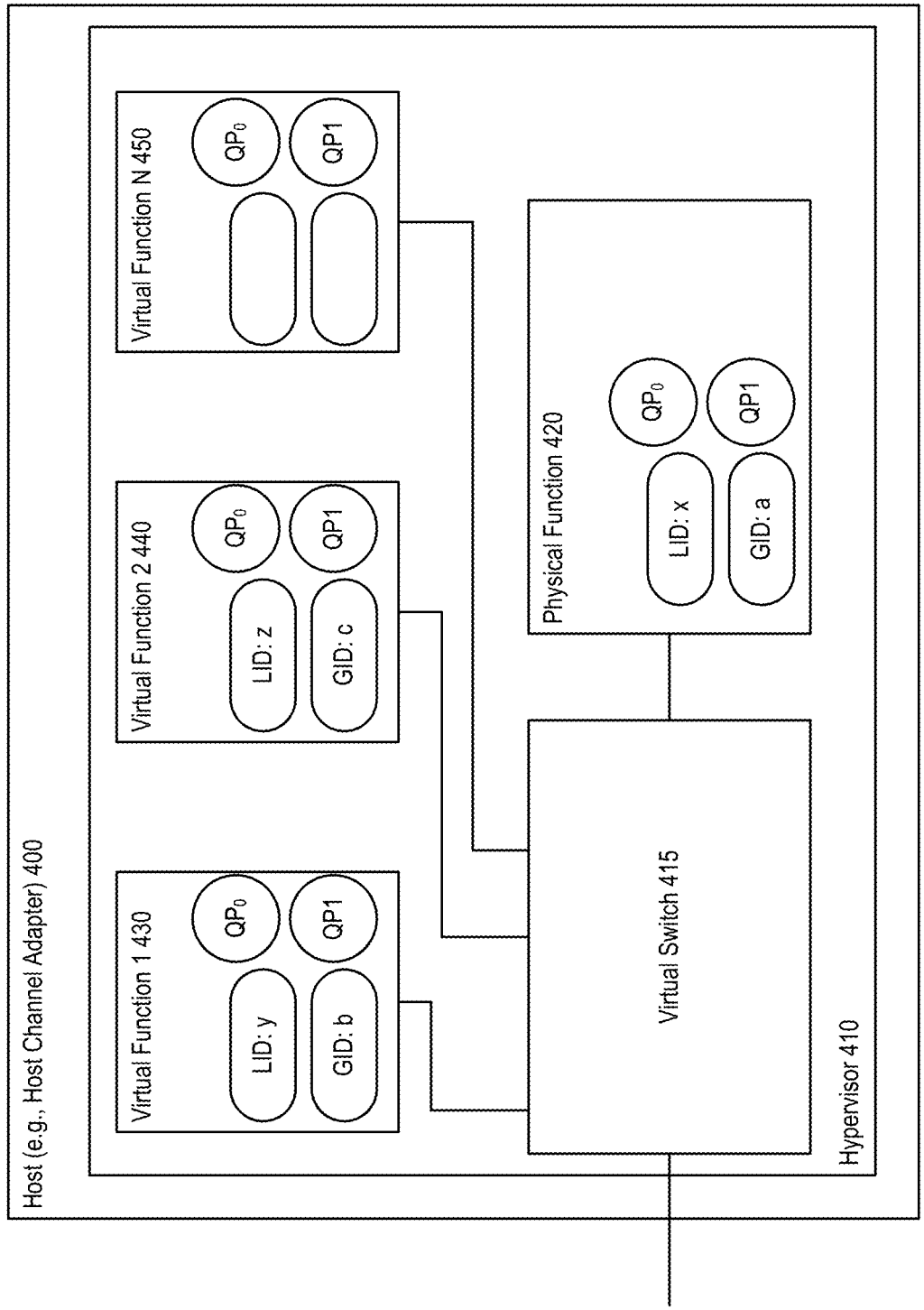
FIG. 4 shows an exemplary vSwitch architecture, in accordance with an embodiment.

FIG. 4 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—vSwitch with Prepopulated LIDs

In accordance with an embodiment, the present disclosure provides a system and method for providing a vSwitch architecture with prepopulated LIDs.

Figure 5:
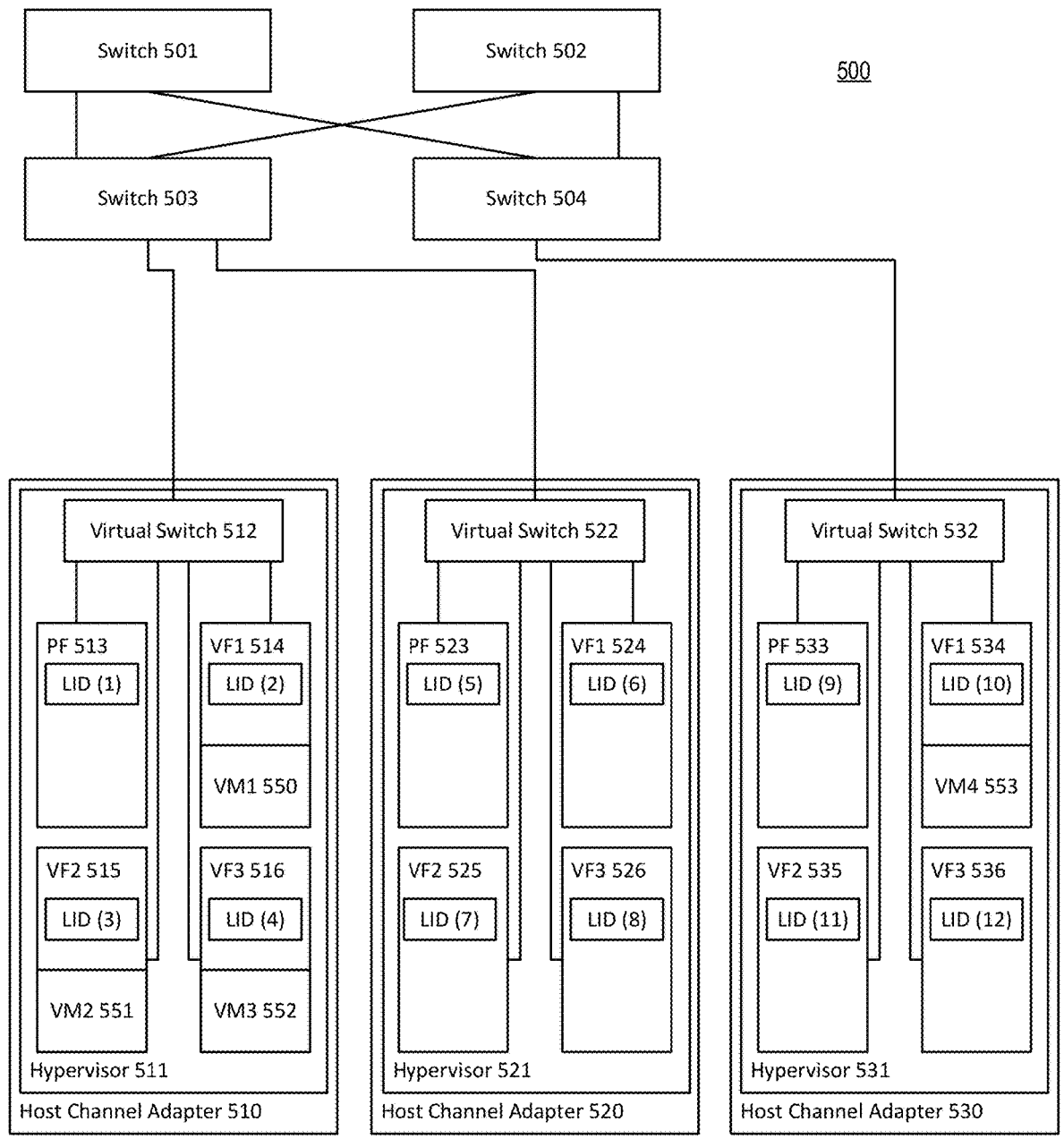
FIG. 5 shows an exemplary vSwitch architecture with prepopulated LIDs, in accordance with an embodiment.

FIG. 5 shows an exemplary vSwitch architecture with prepopulated LIDs, in accordance with an embodiment. As depicted in the figure, a number of switches 501-504 can provide communication within the network switched environment 500 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 500.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 5, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 5.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF.

In accordance with an embodiment, in a vSwitch architecture with prepopulated LIDs, communication paths are computed for all the LIDs once when the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID-Mask-Control-like (LMC-like) feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 6:
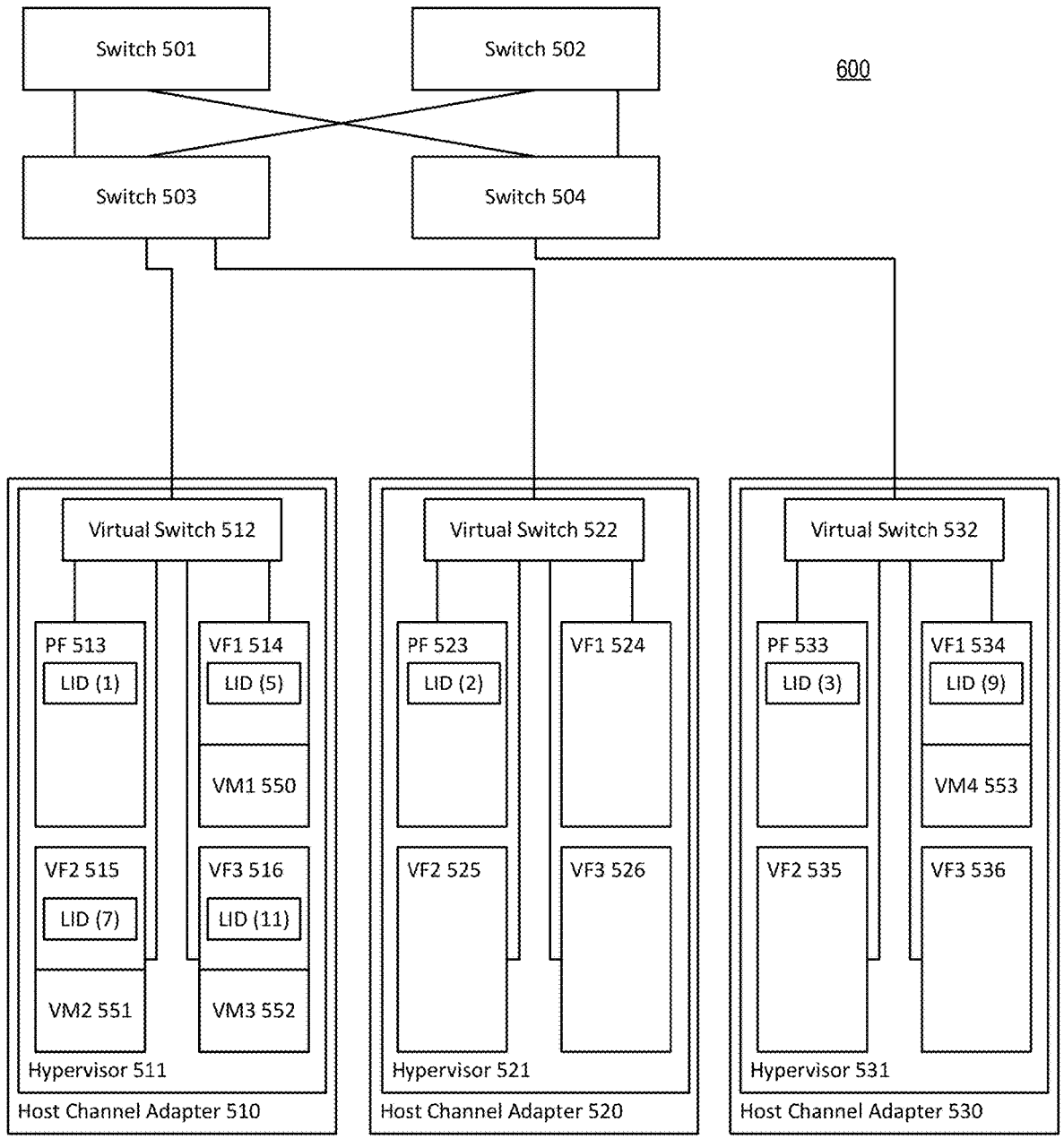
FIG. 6 shows an exemplary vSwitch architecture with dynamic LID assignment, in accordance with an embodiment.

FIG. 6 shows an exemplary vSwitch architecture with dynamic LID assignment, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 6, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and virtual function 9 being assigned to virtual function 1 535. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet can be updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 7:
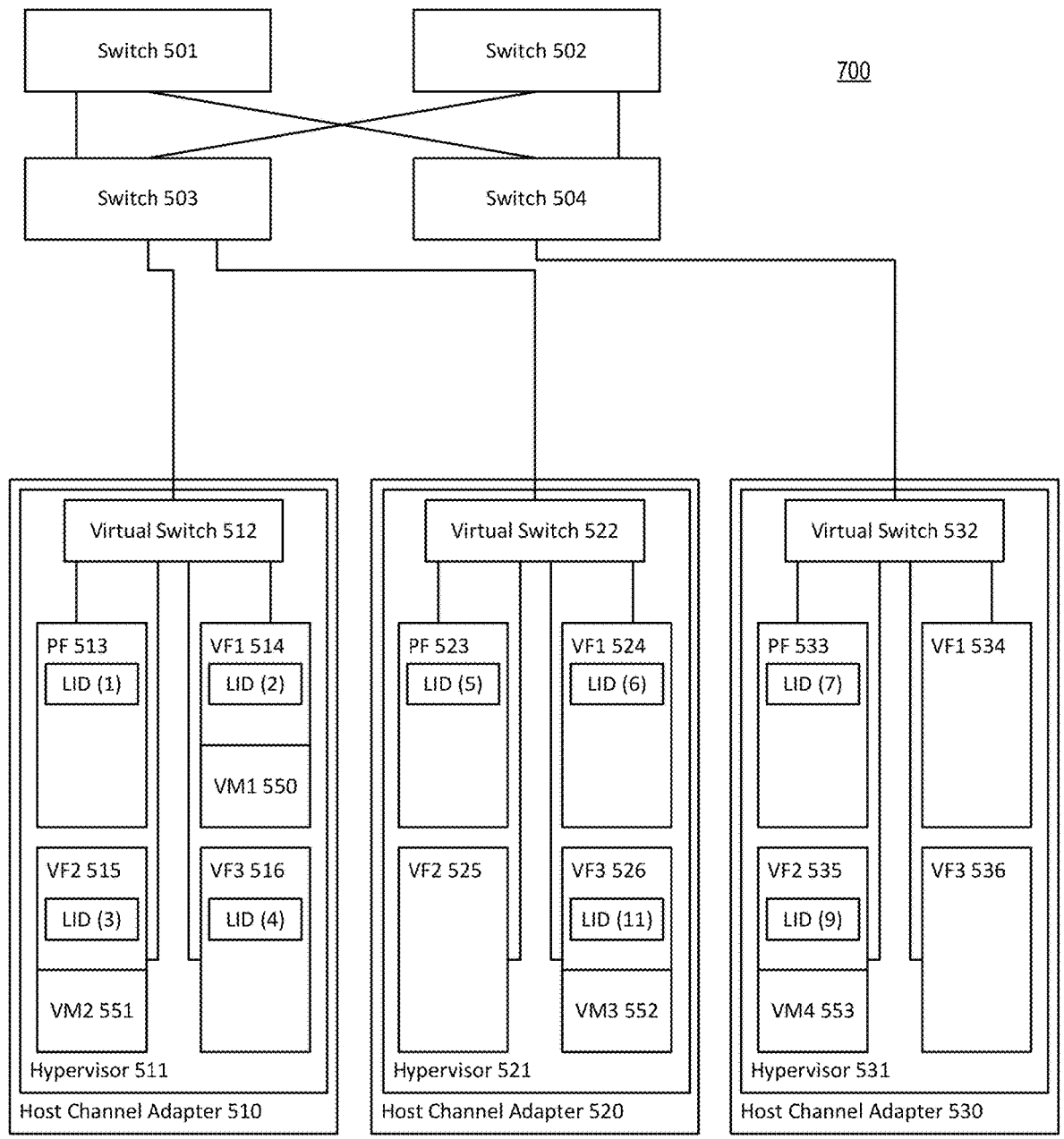
FIG. 7 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 7 shows an exemplary vSwitch architecture with vSwitch with dynamic LID assignment and prepopulated LIDs, in accordance with an embodiment. As depicted in the figure, a number of switches 501-504 can provide communication within the network switched environment 500 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 7, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 7, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

Dynamic Reconfiguration with vSwitches

In accordance with an embodiment, the present disclosure provides a system and method for dynamic network reconfiguration with vSwitches. In a dynamic cloud environment, live migrations can be handled and can be scalable. When a VM is migrated and has to carry its addresses to the destination, a network reconfiguration is necessary. Migration of the virtual or alias GUIDs (vGUIDs), and consequently the GIDs, do not pose significant burdens as they are high level addresses that do not affect the underlying IB routing (e.g., linear forwarding tables and routes). For the migration of the vGUID, an SMP has to be sent to the destination hypervisor in order to set the vGUID that is associated with the incoming VM, to the VF that will be assigned on the VM when the migration will be completed. However, migration of the LID is not so simple, because the routes have to be recalculated and the LFTs of the physical switches need to be reconfigured. Recalculation of the routes and distribution needs a considerable amount of time that lies in the order of minutes on large subnets, posing scalability challenges.

In accordance with an embodiment, a vSwitch has the property that all VFs accessed through the vSwitch share the same uplink with the PF. A topology agnostic dynamic reconfiguration mechanism can utilize this property to make the reconfiguration viable on dynamic migration environments. The LID reconfiguration time can be minimized by eliminating the path computation and reducing the path distribution. The method differs slightly for the two vSwitch architectures discussed above (prepopulation of LIDs and dynamic LID assignment), but the basis is the same.

In accordance with an embodiment, the dynamic reconfiguration method includes two general steps: (a) Updating the LIDs in the participating hypervisors: one Subnet Management Packet (SMP) is sent to each of the hypervisors that participate in the live migration, instructing them to set/unset the proper LID to the corresponding VF; and (b) Updating the Linear Forwarding Tables (LFTs) on the physical switches: one or a maximum of two SMPs are sent on one or more switches, forcing them to update their corresponding LFT entries to reflect the new position of a migrated virtual machine. This is shown more specifically below in the procedures to migrate a virtual machine and reconfigure a network:

```
 1: procedure UPDATELFTBLOCK(LFTBlock, Switch)
 2:     // If the LFT block needs to be updated send SMP on the switch
            to
 3:     // update the LFTBlock. When Swapping LIDs, 1 or 2 of all
 4:     //the LFT Blocks may need to be updated per switch. When
            copying
 5:     // LIDs, only 1 of all the LFT Blocks may need to be updated
 6:     // per switch.
 7:     if LFTBlock in Switch needs to be updated then
 8:         Send SMP on Switch to update LFTBlock
 9:     end if
10: end procedure
11: procedure UPDATELFTBLOCKSONALLSWITCHES
12:     /* iterate through all LFTBlocks on all Switches
13:      * and update the LFTBlocks if needed. */
```

```
14:     for LFTBlock in All_LFTBlocks do
15:         for sw in All_switches do
16:             UPDATELFTBLOCK(LFTBlock, sw)
17:         end for
18:     end for
19: end procedure
20: procedure MIGRATEVM(VM, DestHypervisor)
21:     Detach IB VF from VM
22:     Start live migration of VM to the DestHypervisor
23:     /* Reconfiguration of the network is following */
24:     // The migration procedure of the LID address slightly
25:     // differs in vSwitch with prepopulated LIDs and vSwitch
            with dynamic LID assignment.
26:     /* Step described in Updating the LIDs in the participating
            hypervisors */
27:     Migrate the IB addresses of VM
28:     /* Step described in Updating the Linear Forwarding Tables
            (LFTs) on the physical switches */
29:     UPDATELFTBLOCKSONALLSWITCHES
30: end procedure
31: procedure MAIN
32:     MIGRATEVM(VM_to_be_Migrated, toHypervisor)
33: end procedure
```

Reconfiguration in vSwitch with Prepopulated LIDs

Figure 8:
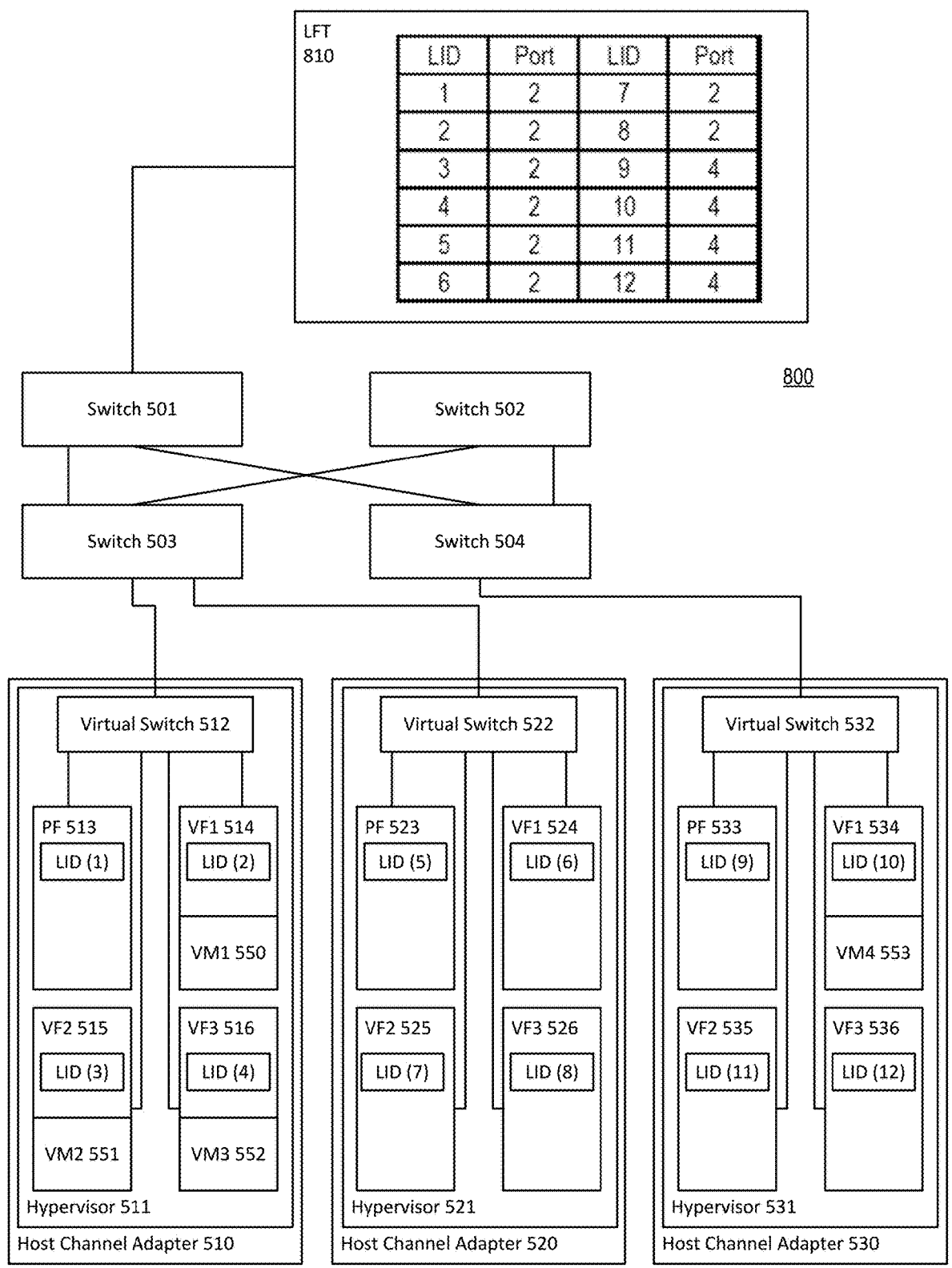
FIG. 8 shows an exemplary vSwitch architecture with prepopulated LIDs prior to a virtual machine migration, in accordance with an embodiment.

FIG. 8 shows an exemplary vSwitch architecture with prepopulated LIDs prior to a virtual machine migration, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, each of the switches 501-504 can comprise a number of ports (not shown), which are used in setting a linear forwarding table, such as linear forwarding table 810 associated with switch 501, in order to direct traffic within the network switched environment 800. As shown in the figure, linear forwarding table 810 forwards traffic addressed to virtual machine 2 551 (i.e., LID 3) through port 2 of switch 501. Likewise, because paths exist for all LIDs even if VMs are not running, the linear forwarding table can define a forwarding path to LID 12 through port 4 of switch 501.

Figure 9:
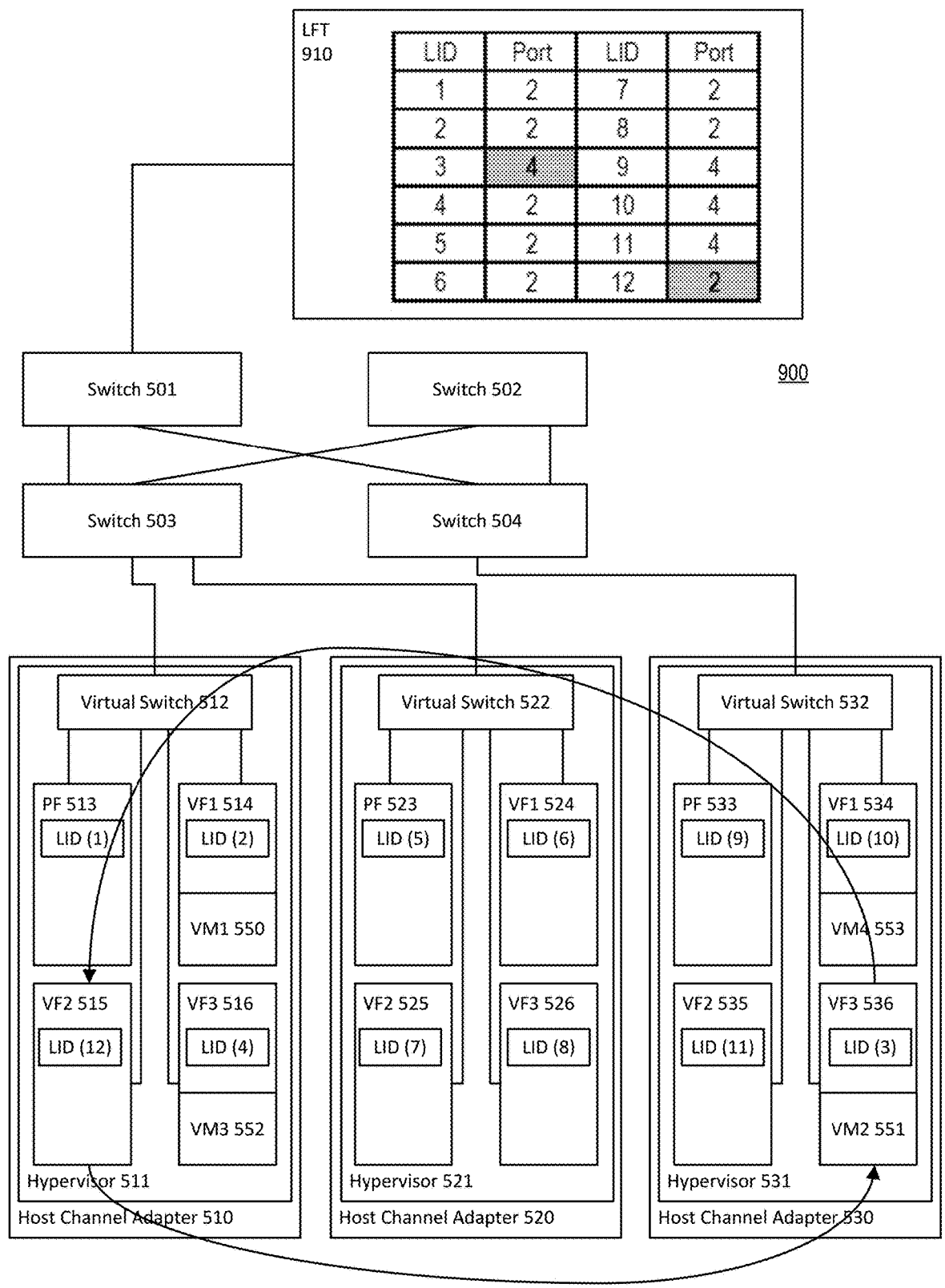
FIG. 9 shows an exemplary vSwitch architecture with prepopulated LIDs after a virtual machine migration, in accordance with an embodiment.

FIG. 9 shows an exemplary vSwitch architecture with prepopulated LIDs after a virtual machine migration, in accordance with an embodiment. As depicted in the figure, a number of switches 501-504 can provide communication within the network switched environment 900 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, each of the switches 501-504 can comprise a number of ports (not shown), which are used in setting a linear forwarding table, such as linear forwarding table 910 associated with switch 501, in order to direct traffic within the network switched environment 900.

In accordance with an embodiment, if virtual machine 2 551 needs to be migrated from hypervisor 511 to hypervisor 531, and virtual function 3 536 on hypervisor 531 is available, virtual machine 2 can be attached to virtual function 3 536. In such a situation, the LIDs can swap (i.e., the entry of the LID that is assigned to the migrating VM can be swapped with the LID of the VF that is going to be used at the destination hypervisor after the live migration is completed). The linear forwarding table 910 on switch 501 can be updated as shown in the figure, namely that traffic to LID 3 is now forwarded through port 4 (previously port 2), and the path to LID 12 is now forwarded through port 2 (previously port 4).

In accordance with an embodiment, for vSwitch architecture with prepopulated LIDs, paths exist for all of the LIDs even if VMs are not running. In order to migrate a LID and keep the balancing of the initial routing, two LFT entries on all switches can be swapped—the entry of the LID that is assigned to the migrating VM, with the LID of the VF that is going to be used at the destination hypervisor after the live migration is completed (i.e., the virtual function that the migrating virtual machine attaches to at the destination hypervisor). In referring again to FIGS. 7 and 8, if VM1 550 with LID 2 needs to be migrated from hypervisor 551 to hypervisor 531, and VF3 536 with LID 12 on hypervisor 531 is available and decided to be attached to the migrating virtual machine 1 551, the LFTs of the switch 501 can be updated. Before the migration LID 2 was forwarded through port 2, and LID 12 was forwarded through port 4. After the migration LID 2 is forwarded through port 4, and LID 12 is forwarded through port 2. In this case, only one SMP needs to be sent for this update because LFTs are updated in blocks of 64 LIDs per block, and both LID 2 and 12 are part of the same block that includes the LIDs 0-63. If the LID of VF3 on hypervisor 531 was instead 64 or greater, then two SMPs would need to be sent as two LFT blocks would have to be updated: the block that contains LID 2 (the VM LID) and the block that contains the LID to be swapped that is bigger than 63.

Reconfiguration in vSwitch with Dynamic LID Assignment

In accordance with an embodiment, for the vSwitch architecture with Dynamic LID assignment, the path of a VF follows the same path as the path of the corresponding PF of the hypervisor where the VM is currently hosted. When a VM moves, the system has to find the LID that is assigned to the PF of the destination hypervisor, and iterate through all the LFTs of all switches and update the path for the VM LID with the path of the destination hypervisor. In contrast to the LID swapping technique that is used in the reconfiguration with prepopulated LIDs, only one SMP needs to be sent at all times to the switches that need to be updated, since there is only one LID involved in the process.

Traditional Cost of Reconfiguration

In accordance with an embodiment, the time, $RC_t$, needed for a full network reconfiguration method is the sum of the time needed for the path computation, $PC_t$, plus the time needed for the LFTs Distribution, $LFTD_t$, to all switches, as shown in equation 1:

$$RC_t = PC_t + LFTD_t \qquad (1)$$

In accordance with an embodiment, the computational complexity of the paths is polynomially growing with the size of the subnet, and $PC_t$ is in the order of several minutes on large subnets.

After the paths have been computed, the LFTs of the switches in a network, such as an IB subnet, can be updated. The LFT distribution time $LFTD_t$ grows linearly with the size of the subnet and the amount of switches. As mentioned above, LFTs are updated on blocks of 64 LIDs so in a small subnet with a few switches and up to 64 consumed LIDs, only one SMP needs to be sent to each switch during path distribution. In other situations, where, such as a fully populated IB subnet with 49151 LIDs consumed, 768 SMPs per switch are needed to be sent during path distribution in a traditional model.

The SMPs can use either directed routing or destination based routing. When using directed routing, each intermediate switch has to process and update the headers of the packet with the current hop pointer and reverse path before forwarding the packet to the next hop. In the destination based routing, each packet is forwarded immediately. Naturally, directed routing can add latency to the forwarded packets. Nevertheless, directed routing is used by OpenSM for all traditional SMPs. This is necessary for the initial topology discovery process where the LFTs have not been distributed yet to the switches, or when a reconfiguration is taking place and the routes towards the switches are changing.

Let n be a number of switches in the network; m the number of all LFT blocks that will be updated on each switch, determined by the number of consumed LIDs; k the average time needed for each SMP to traverse the network before reaching each switch; and r the average time added for each SMP due to the directed routing. Assuming no pipelining, the LFT distribution time $LFTD_t$ can be broken further down in equation 2:

$$LFTD_t = n \cdot m \cdot (k+r) \qquad (2)$$

By combining equations 1 and 2, equation 3 is a result for the time needed for a full network re-configuration:

$$RC_t = PC_t + n \cdot m \cdot (k+r) \qquad (3)$$

In large subnets, traditionally, the time needed for the path computation, $PC_t$, is much greater than the time needed for the LFTs distribution, $LFTD_t$, even though the $LFTD_t$ becomes larger when more LIDs, and consequently more LFT blocks per switch m are used, and when more switches n are present in the network. The n·m part in equations 2 and 3 defines the total number of SMPs that needs to be sent for the reconfiguration.

Reconfiguration Cost for Live Migration with vSwitch Architecture

Using traditional reconfiguration techniques would render VM migrations unusable. In large subnets, the $PC_t$ in equation 3 becomes very large and dominates $RC_t$. If a live migration triggered a full traditional reconfiguration, it would generally take several minutes to complete.

In accordance with an embodiment, by utilizing the vSwitch with prepopulated LIDs or vSwitch with dynamic LID assignment, the $PC_t$ portion of the reconfiguration time can be essentially eliminated since the paths are already calculated to swap or copy LID entries in the LFT of each switch. Furthermore, there is no need to send m SMPs per switch, because when a VM is migrated, only one or a maximum of two LIDs are affected depending on which of the proposed vSwitch schemes is used, regardless of the total number of LFT blocks. As a result, only $m' \in \{1, 2\}$ SMPs are needed to be sent to the switches for each migration (m'=2 if the two LID entries are not located in the same LFT block when the LIDs are prepopulated, otherwise m'=1). As well, there are certain cases that 0<n'<n switches need to be updated.

Figure 10:
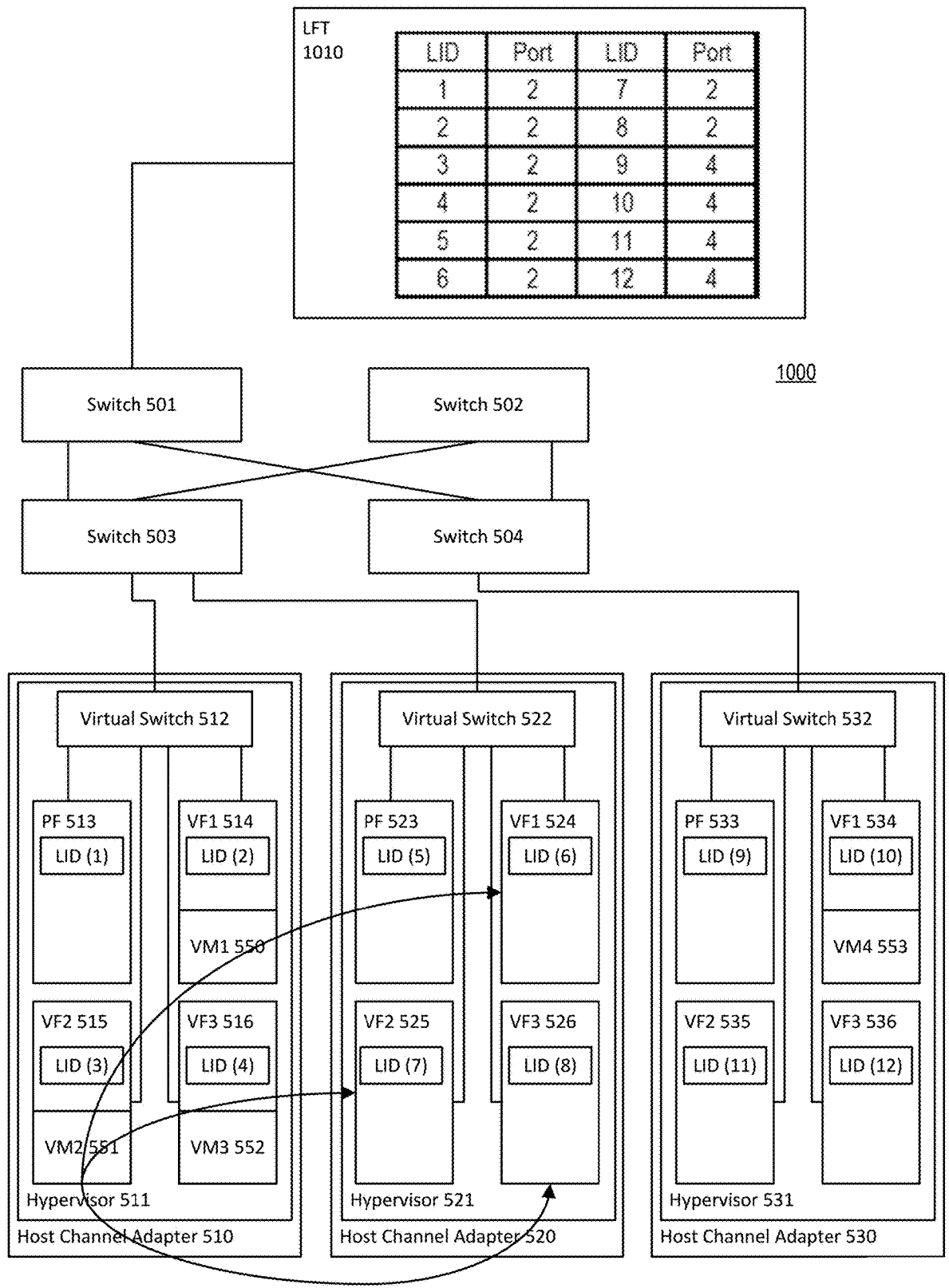
FIG. 10 shows an exemplary vSwitch architecture with prepopulated LIDs with potential virtual machine migration paths, in accordance with an embodiment.

In accordance with an embodiment, referring now to FIG. 10 which shows an exemplary vSwitch architecture with prepopulated LIDs with potential virtual machine migration paths, in accordance with an embodiment. As depicted in the figure, a number of switches 501-504 can provide communication within the network switched environment 1000 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, each of the switches 501-504 can comprise a number of ports (not shown), which are used in setting a linear forwarding table, such as linear forwarding table 1010 associated with switch 501, in order to direct traffic within the network switched environment 1000.

In accordance with an embodiment, FIG. 10 depicts a situation in a network switched environment 1000 where VM2 551 can potentially migrate from hypervisor 511 to hypervisor 521 (where there are three available virtual functions). If LID 3 was swapped with any of the available LIDs in hypervisor 521 (6, 7 or 8), then the switch 501 would not need to be updated at all, because the initial routing already routes LID 3 and LIDs 6, 7 and 8 share the same port (port 2) on switch 501. In particular for this example n'=1, because only the switch 503 (i.e., a leaf switch) would need to be updated.

In accordance with an embodiment, eventually, the cost vSwitch $RC_t$ of the disclosed reconfiguration mechanism is found in equation 4, and in large subnets, vSwitch $RC_t$ is much less than $RC_t$.

$$\text{vSwitch\_}RC_t = n' \cdot m' \cdot (k+r) \quad (4)$$

In accordance with an embodiment, destination based routing for the SMP packets can be used. When VMs are migrated, the routes for the LIDs belonging to switches will not be affected. Therefore, destination based routing can guarantee proper delivery of SMPs to the switches and r can be eliminated from equation 4, giving equation 5:

$$\text{vSwitch\_}RC_t = n' \cdot m' \cdot k \quad (5)$$

In accordance with an embodiment, pipelining can be used to even further reduce the vSwitch reconfiguration time.

Scalable Multi-Homed Routing for vSwitch Based HCA Virtualization

In accordance with an embodiment, when virtual switch (aka vSwitch) based IB HCA virtualization is used, the number of endports in the IB subnet increases dramatically. This can lead to non-optimal routing of both small and large fabric topologies (e.g., InfiniBand Fabric Topologies).

In accordance with an embodiment, by identifying vSwitch instances as switches that only have one port/link connecting to the rest of the fabric, whereas it may have zero or more connections to HCA ports, it is possible to identify the vSwitch instance as a main endpoint from a routing perspective without any need for proprietary information.

In accordance with an embodiment, by explicitly identifying a specific HCA implementation based on vendor ID and device ID, it is further possible to identify a vSwitch instance without any chance of mistakenly identifying a degraded physical switch configuration as a virtual switch instance.

In accordance with an embodiment, by handling vSwitch instances as the equivalent of HCA ports when performing a routing algorithm on the discovered topology, it is possible to achieve a level of efficiency and balancing similar or better than in the case of a subnet containing only physical HCAs.

In accordance with an embodiment, by handling identified vSwitches as equivalent to physical HCA port instances, a fabric consisting of both pure physical HCAs as well as virtualized HCAs (or only virtualized HCAs) can, routing wise, be equivalent to a fabric with only physical HCAs.

In accordance with an embodiment, by keeping track of at least one virtual HCA instance that connects to two virtual switches, it is possible to identify "redundant" vSwitches in the same physical HCA and thereby achieve the same level of path independence for paths leading to different ports on the same HCA as has been achieved for physical HCAs.

In accordance, systems and methods can provide for independent routes for multi-homed nodes in fat-trees, so that a single point of failure may not lead to complete outage. This can proceed when, for example, each vSwitch instance is treated as the equivalent of physical HCA ports when performing a routing algorithm on the discovered topology.

Figure 11:
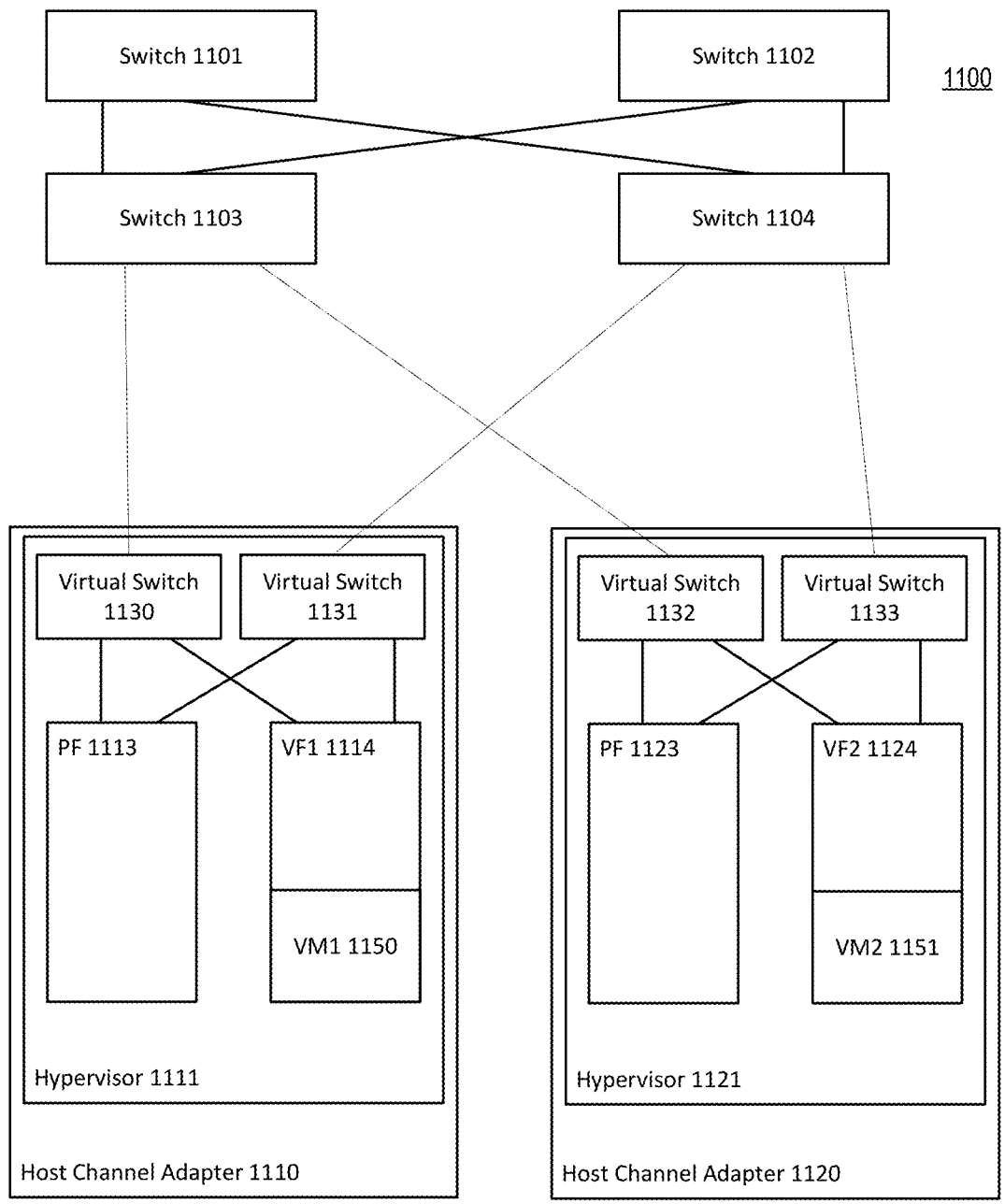
FIG. 11 shows an illustration of supporting scalable multi-homed routing for vSwitch based HCA virtualization, in accordance with an embodiment of the invention.

FIG. 11 shows an illustration of supporting scalable multi-homed routing for vSwitch based HCA virtualization, in accordance with an embodiment of the invention. As depicted in the figure, a number of switches 1101-1104 can provide communication within the network switched environment 1100 (e.g., an IB subnet) between members of a fabric, such as an InfiniBand fabric. The fabric can include a number of hardware devices, such as host channel adapters 1110 and 1120. Each of the host channel adapters can in turn interact with a hypervisor 1111 and 1112, respectively. Each hypervisor can, in turn, in conjunction with the host channel adapter it interacts with, setup and assign a number of virtual functions, such as virtual function 1 1114 and virtual function 2 1124, to a number of virtual machines. For example, virtual machine 1 1150 can be assigned by the hypervisor 1111 to virtual function 1 1114. Hypervisor 1121 can, in turn, assign virtual machine 2 1151 to virtual function 2 1124. The hypervisors can access the host channel adapters through a fully featured physical function 1113 and 1123, respectively, on each of host channel adapters.

In accordance with an embodiment, each of the switches 1101-1104 can comprise a number of ports (not shown), which are used in setting a linear forwarding table in order to direct traffic within the network switched environment 1100.

In accordance with an embodiment, each host channel adapter can be associated with two or more virtual switches, such a virtual switches 1130-1133, which can be handled by their respective hypervisors 1111 and 1121. The vSwitches can be handled as the equivalent of HCA ports when performing a routing algorithm on the discovered topology. By handling the vSwitches in such a manner, it is possible to achieve a level of efficiency and balancing similar or better that in the case of a subnet containing only physical HCAs. In addition, by keeping track of at least one virtual HCA instance that connects to two virtual switches, it is possible to identify "redundant" vSwitches in the same physical HCA and thereby achieve the same level of path independence for paths leading to different ports on the same HCA as has been achieved for physical HCAs.

In accordance with an embodiment of the invention, a multi-homed fat-tree routing mechanism, such as the mFtree mechanism described in U.S. patent application entitled "SYSTEM AND METHOD FOR SUPPORTING MULTI-HOMED FAT-TREE ROUTING IN A MIDDLEWARE MACHINE ENVIRONMENT", application Ser. No. 14/226,288, filed Mar. 26, 2014, can be used for performing the fat-tree routing while treating the vSwitch instances as the physical "ports" on the HCAs.

In accordance with an embodiment, the mFtree mechanism can ensure that calculated paths are redundant (meaning that if a switch, for example a spine switch, were to go down, communication with the HCA via the virtual switches would not be lost). For example, a path from the virtual switch 1130 associated with HCA 1110 can go through leaf switch 1103 and eventually through switch 1101. When making such calculation, the mechanism can mark the switches in the calculated path. The mechanism can avoid using the marked switches for determining the path from virtual switch 1131 on HCA 1110. Thus, the path from virtual switch 1131 on HCA 1110 can be routed through a redundant path via, e.g., leaf switch 1104 and switch 1102.

In accordance with an embodiment, after the calculation of the route for virtual switches 1130 and 1131 has completed, the mechanism can mark the virtual switches as routed so that the routing step is not repeated when the mechanism encounters another port of that node. Thus, the mechanism can ensure that a single point of failure does not lead to a complete outage of a multi-port node.

In accordance with an embodiment, the mechanism can iterate over all leaf switches, and then can iterate over all leaf switch ports for each leaf switch. Thus, the mechanism can be deterministic.

In accordance with an embodiment, the mechanism can take a switch port on a leaf switch in order to find an end node that is associated with the switch port, and can take the virtual switch as a parameter for performing the routing calculation.

In accordance with an embodiment, the mechanism can iterate over all virtual switches on a selected HCA. When all virtual switches on the selected HCA are routed, the routing mechanism can mark the selected HCA as routed so that the HCA is not routed when it is encountered on another leaf switch. Also, the mechanism can improve the performance of the system in various situations (For example, the mechanism can save half of the loop iterations for a two virtual switch HCA).

In accordance with an embodiment, the mechanism may be applied to both a scenario with multiple virtual switches on a single host channel adapter (HCA) and a scenario with multiple virtual switches on two or more HCAs. The mechanism can use different methods for identifying virtual switches on the single HCA or on multiple HCAs on the same logical node.

In accordance with an embodiment, the mechanism can treat redundancy as a primary consideration. The mechanism can choose an upward node of an HCA as the next-hop if it does not route any other ports belonging to the end-node (i.e., when the redundant flag is true).

In accordance with an embodiment, a multi-homed routing mechanism can route a subnet utilizing vSwitch based HCA virtualization in such a way that the paths to each virtual switch on a HCA are exclusive, i.e., the mechanism can ensure each vSwitch on a HCA having two or more virtual switches is reachable through an independent path.

Furthermore, in the case of a single multi-homed HCA, the mechanism can ensure that no single link is shared by paths to any pair of virtual switches belonging to the same end node. Also, when there is concurrent traffic from different source ports to different virtual switches on the same destination HCA in the network fabric, the mechanism can ensure that the concurrent traffic is not sharing any intermediate link when an alternative route exists.

Thus, in accordance with an embodiment, using such a routing mechanism can ensure that a failure of a single device, such as the spine switch 1101 in the fabric, may not cause the node HCA 1110 to be disconnected, because the paths to the different virtual switches do not converge at the single spine switch 1101.

Additionally, in accordance with an embodiment, the mechanism can treat each port on a same HCA as a separate and independent entity (e.g., identified by vendor and device ID). Thus, the mechanism can route on a HCA-basis instead of on a vSwitch-basis, and the mechanism can address the different characteristics that different end HCAs may have.

In accordance with an embodiment, in order to minimize the time needed for setting up LID routing towards the various vHCA ports, the routing for the LID associated vSwitch instance can be copied for the LID associated with the vHCA port.

In accordance with an embodiment, the copying of the routing can be achieved by looking up the forwarding table entry for the vSwitch LID in all physical switches (after the routing has been completed) and then copying the relevant switch port number to the forwarding table entry for the LID of the vHCA port.

FIG. 12 is a flow chart of a method for supporting scalable multi-homed routing for virtual switch based host channel adapter (HCA) virtualization in a subnet, in accordance with an embodiment. At step 1210, the method can provide, at one or more computers, including one or more microprocessors, one or more switches, the one or more switches comprising at least a leaf switch, wherein each of the one or more switches comprise a plurality of ports; a plurality of host channel adapters, wherein one or more of the plurality of host channel adapters comprise at least one virtual function, and wherein the plurality of host channel adapters are interconnected via the one or more switches; a plurality of hypervisors, wherein each of the one or more hypervisors are associated with at least one host channel adapter of the one or more host channel adapters that comprise at least one virtual function; and a plurality of virtual machines, wherein each of the plurality of virtual machines are associated with at least one virtual function.

At step 1220, the method can arrange the plurality of host channel adapters that comprise at least one virtual function with one or more of a virtual switch with prepopulated local identifiers (LIDs) architecture or a virtual switch with dynamic LID assignment architecture.

At step 1230, the method can perform a multi-homed routing for the subnet; wherein at least one of the plurality of host channel adapters that comprise at least one virtual function comprises two virtual switches, wherein the two virtual switches are treated as endpoints of the subnet; and wherein the multi-homed routing for the subnet ensures that each the two virtual switches are routed through independent paths.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting multi-homed routing for virtual switch based host channel adapter (HCA) virtualization, comprising:
   one or more microprocessors; and
   a subnet comprising:
      a plurality of switches,
      a host channel adapter comprising at least two virtual switches;
   wherein a subnet management component of the subnet calculates a routing for the subnet;
   wherein the subnet management component, in calculating the routing for the subnet, handles each of the at least two virtual switches as physical host channel adapter ports of the host channel adapter; and
   wherein, as a result of the subnet management component handling each of the at least two virtual switches as physical host channel adapter ports of the host channel adapter, the calculation of the routing for the subnet results in exclusive and independent routes for each of the at least two virtual switches of the host channel adapter such that routing to the host channel adapter such that communication to the host channel adapter is not interrupted by a failure of a switch of the plurality of switches.

2. The system of claim 1,
   wherein the host channel adapter comprises a plurality of virtual functions.

3. The system of claim 2,
   wherein at least two of the virtual functions of the host channel adapter are utilized for connecting at least two virtual machines to the subnet.

4. The system of claim 3,
   wherein each of the at least two virtual machines are connected to both of the at least two virtual switches within the host channel adapter.

5. The system of claim 1,
   wherein the subnet management component, in calculating the routing for the subnet, ensures that a failure of a switch of the plurality of switches does not cause a drop in communication with the host channel adapter.

6. The system of claim 1, wherein each of the at least two virtual switches are identified within the subnet by a vendor identification and a device identification of the host channel adapter.

7. A method for supporting multi-homed routing for virtual switch based host channel adapter (HCA) virtualization, comprising:
   providing, at one or more computers, including one or more microprocessors, a subnet, the subnet comprising:
      a plurality of switches, and
      a host channel adapter comprising at least two virtual switches;
   calculating, by a subnet management component of the subnet, a routing for the subnet;
   wherein the subnet management component, in calculating the routing for the subnet, handles each of the at least two virtual switches as physical host channel adapter ports of the host channel adapter; and
   wherein, as a result of the subnet management component handling each of the at least two virtual switches as physical host channel adapter ports of the host channel adapter, the calculation of the routing for the subnet results in exclusive and independent routes for each of the at least two virtual switches of the host channel adapter such that routing to the host channel adapter such that communication to the host channel adapter is not interrupted by a failure of a switch of the plurality of switches.

8. The method of claim 7,
   wherein the host channel adapter comprises a plurality of virtual functions.

9. The method of claim 8,
   wherein at least two of the virtual functions of the host channel adapter are utilized for connecting at least two virtual machines to the subnet.

10. The method of claim 9,
    wherein each of the at least two virtual machines are connected to both of the at least two virtual switches within the host channel adapter.

11. The method of claim 7,
    wherein the subnet management component, in calculating the routing for the subnet, ensures that a failure of a switch of the plurality of switches does not cause a drop in communication with the host channel adapter.

12. The method of claim 7, wherein each of the at least two virtual switches are identified within the subnet by a vendor identification and a device identification of the host channel adapter.

13. A non-transitory computer readable storage medium, including instructions stored thereon for supporting multi-homed routing for virtual switch based host channel adapter (HCA) virtualization in a subnet which when read and executed by one or more computers cause the one or more computers to perform steps comprising:
    providing, at one or more computers, including one or more microprocessors, a subnet, the subnet comprising:
       a plurality of switches, and
       a host channel adapter comprising at least two virtual switches;
    calculating, by a subnet management component of the subnet, a routing for the subnet;
    wherein the subnet management component, in calculating the routing for the subnet, handles each of the at least two virtual switches as physical host channel adapter ports of the host channel adapter; and
    wherein, as a result of the subnet management component handling each of the at least two virtual switches as physical host channel adapter ports of the host channel adapter, the calculation of the routing for the subnet results in exclusive and independent routes for each of the at least two virtual switches of the host channel adapter such that routing to the host channel adapter such that communication to the host channel adapter is not interrupted by a failure of a switch of the plurality of switches.

14. The non-transitory computer readable storage medium of claim 13,
    wherein the host channel adapter comprises a plurality of virtual functions.

15. The non-transitory computer readable storage medium of claim 14, wherein at least two of the virtual functions of the host channel adapter are utilized for connecting at least two virtual machines to the subnet.

16. The non-transitory computer readable storage medium of claim 15,
wherein each of the at least two virtual machines are connected to both of the at least two virtual switches within the host channel adapter.

17. The non-transitory computer readable storage medium of claim 13,
wherein the subnet management component, in calculating the routing for the subnet, ensures that a failure of a switch of the plurality of switches does not cause a drop in communication with the host channel adapter.

* * * * *

UNITED STATES PATENT AND TRADEMARK OFFICE
CERTIFICATE OF CORRECTION

| | | |
|---|---|---|
| PATENT NO. | : 11,750,513 B2 | |
| APPLICATION NO. | : 17/387142 | |
| DATED | : September 5, 2023 | |
| INVENTOR(S) | : Bogdanski et al. | |

It is certified that error appears in the above-identified patent and that said Letters Patent is hereby corrected as shown below:

On the Title Page

Column 2, under item (56), Other Publications, Line 2, delete "fro" and insert -- from --, therefor.

On page 2, Column 1, under item (57), Abstract, Line 1, delete "each" and insert -- each of --, therefor.

On page 2, Column 2, under item (56), U.S. Patent Documents, Line 30, delete "Dubai" and insert -- Dubal --, therefor.

In the Specification

In Column 2, Line 25, delete "each" and insert -- each of --, therefor.

In Column 12, Line 30, delete "routes" and insert -- routes. --, therefor.

In Column 20, Line 38, delete "a" and insert -- as --, therefor.

In Column 22, Line 43, delete "each" and insert -- each of --, therefor.

Signed and Sealed this
Eighteenth Day of June, 2024

Katherine Kelly Vidal
*Director of the United States Patent and Trademark Office*